(No Model.) 5 Sheets—Sheet 1.
L. J. R. HOLST.
PHOTOGRAPHIC CAMERA.
No. 589,349. Patented Aug. 31, 1897.
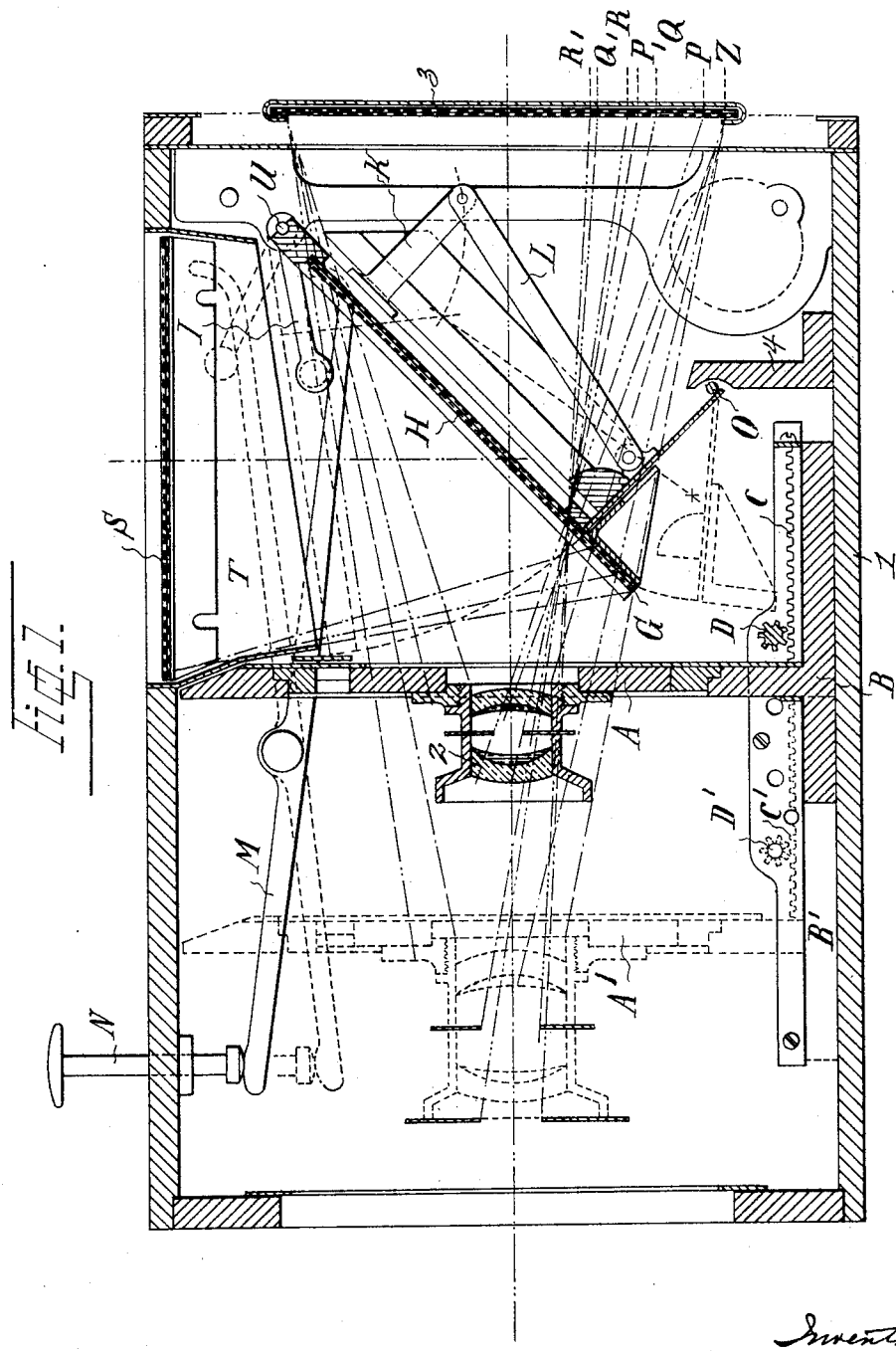
Witnesses:
D. S. Ober
O. W. Sommers
Inventor.
Lodewyk J. R. Holst,
by Henry [illegible]
Attorney (No Model.) 5 Sheets—Sheet 2.
L. J. R. HOLST.
PHOTOGRAPHIC CAMERA.
No. 589,349. Patented Aug. 31, 1897.
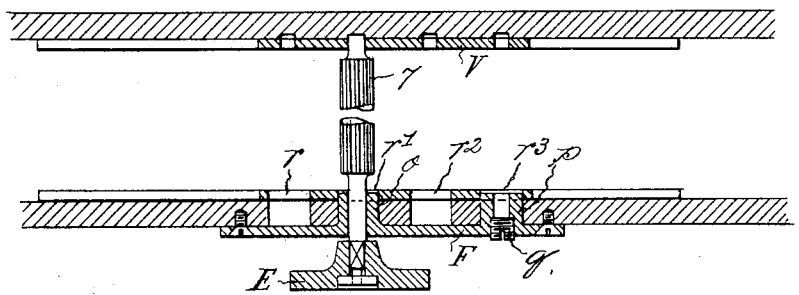
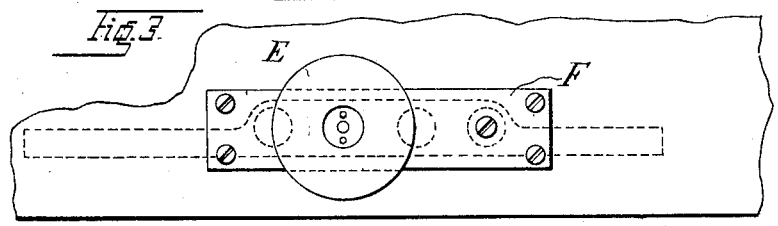
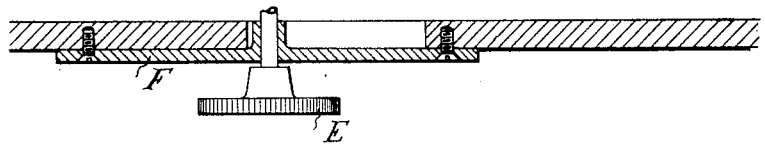
Witnesses
B. S. Ober.
B. K. Sommers
Inventor:
Lodewyk J. R. Holst.
By [signature]
Attorney.

(No Model.) 5 Sheets—Sheet 3.
L. J. R. HOLST.
PHOTOGRAPHIC CAMERA.
No. 589,349. Patented Aug. 31, 1897.
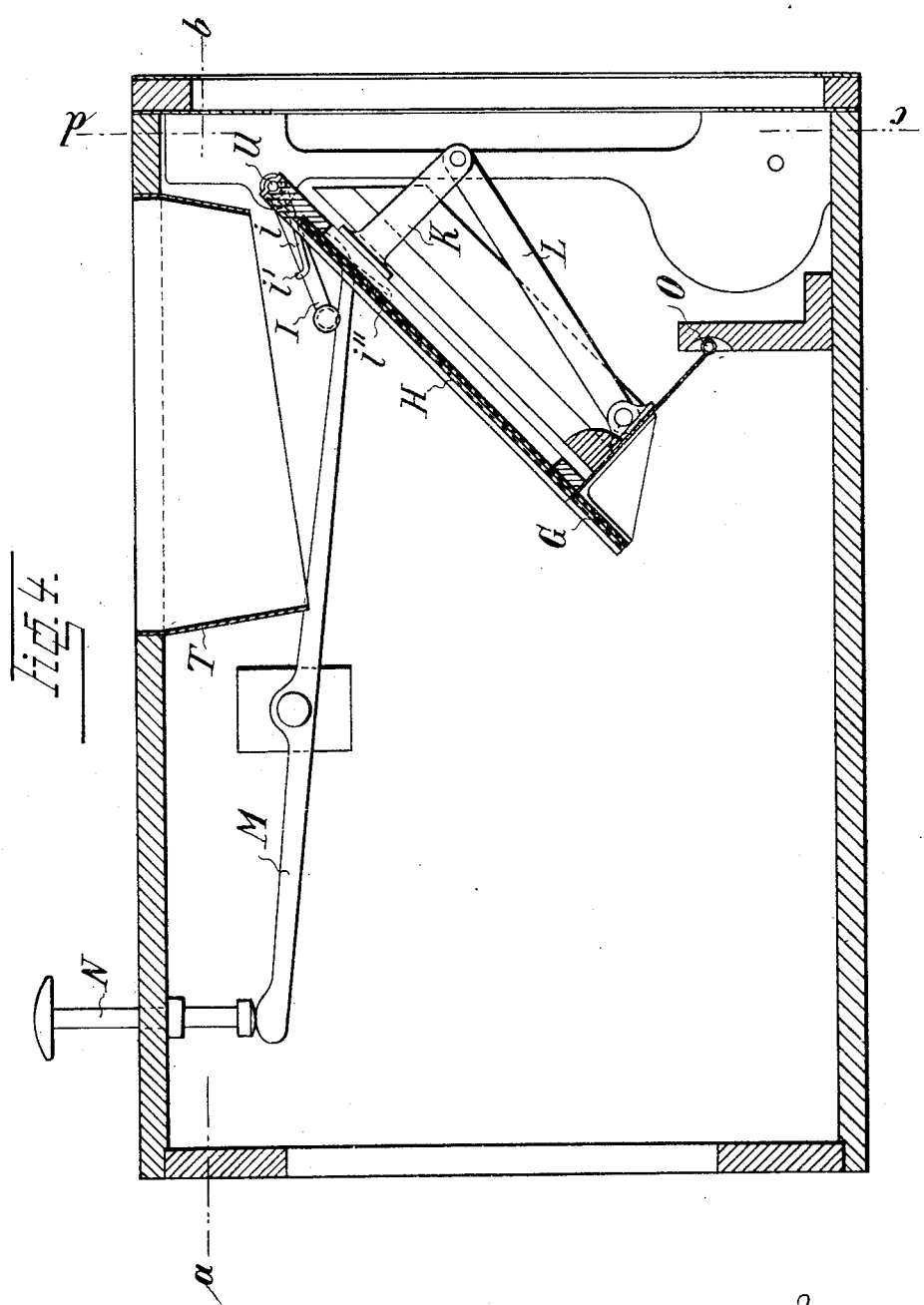

(No Model.)
5 Sheets—Sheet 4.
L. J. R. HOLST.
PHOTOGRAPHIC CAMERA.
No. 589,349. Patented Aug. 31, 1897.
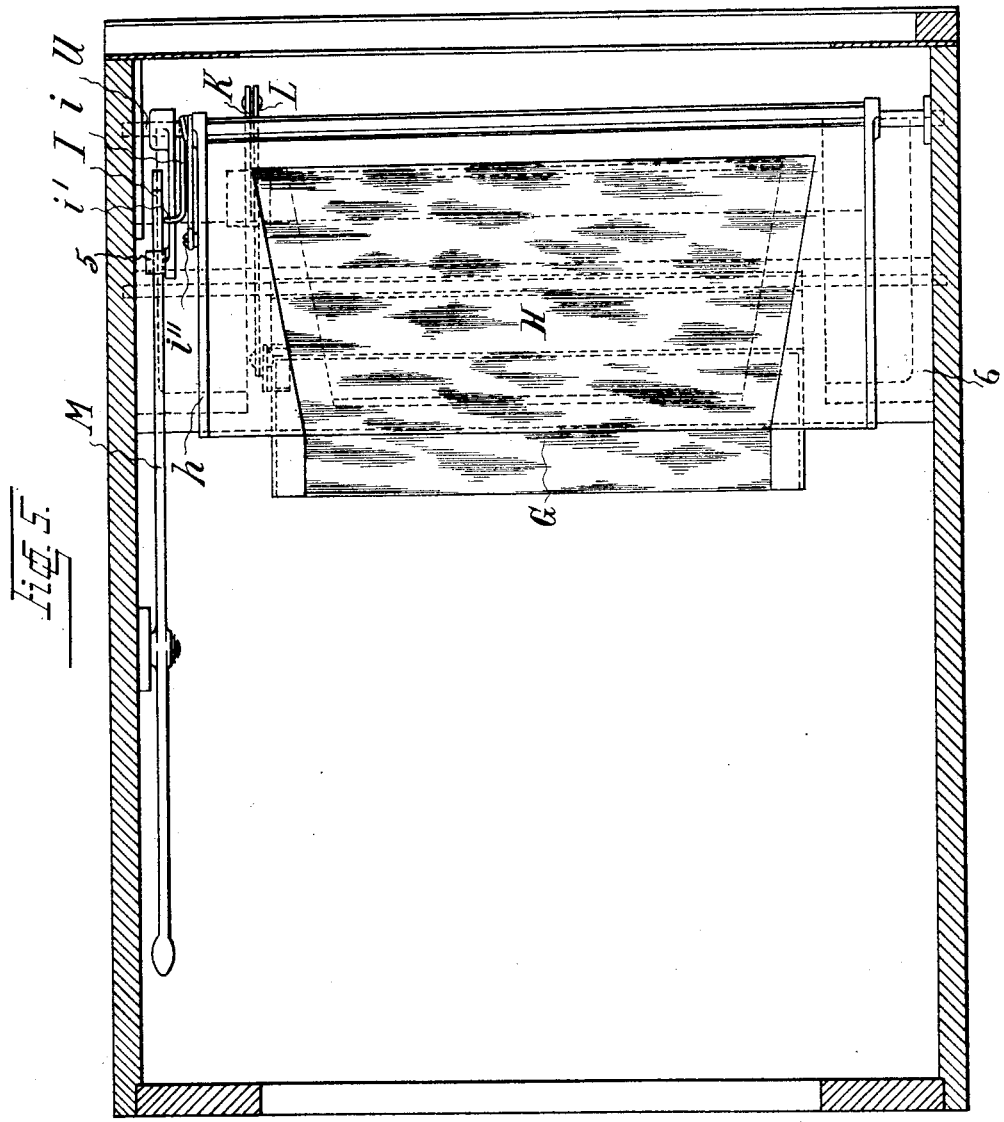

(No Model.) 5 Sheets—Sheet 5.
L. J. R. HOLST.
PHOTOGRAPHIC CAMERA.
No. 589,349. Patented Aug. 31, 1897.
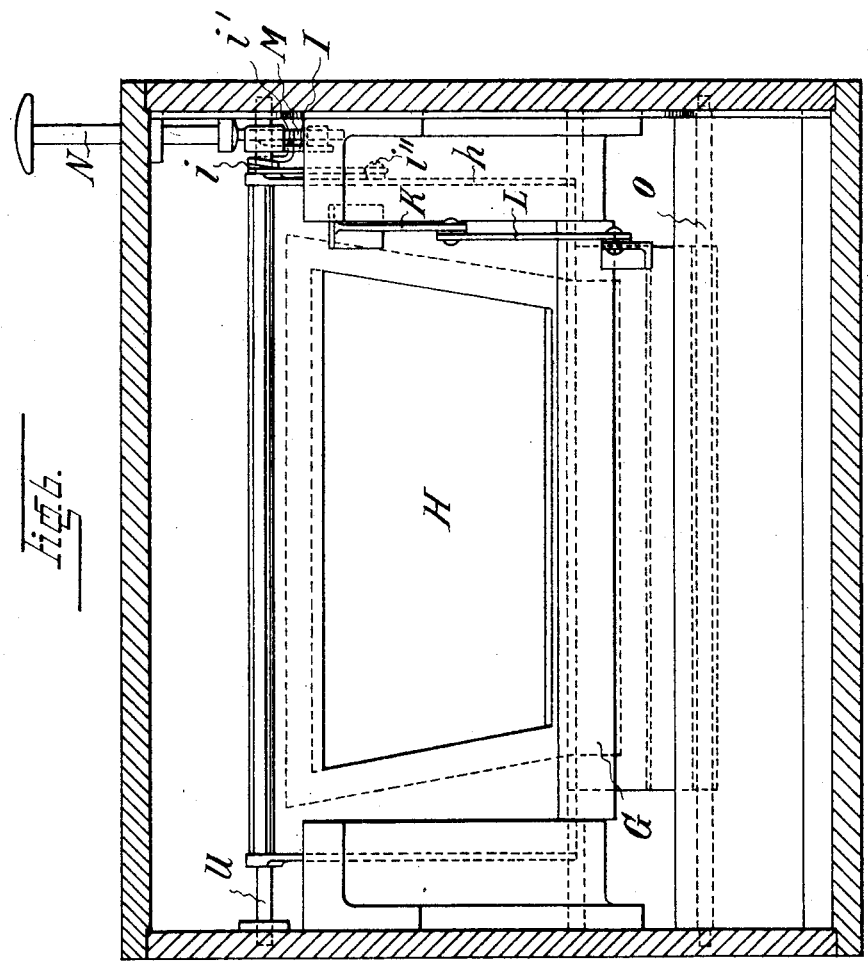

UNITED STATES PATENT OFFICE.

LODEWYK JAN RUTGER HOLST, OF AMSTERDAM, NETHERLANDS.

PHOTOGRAPHIC CAMERA.

SPECIFICATION forming part of Letters Patent No. 589,349, dated August 31, 1897.

Application filed February 12, 1897. Serial No. 623,138. (No model.)

*To all whom it may concern:*

Be it known that I, LODEWYK JAN RUTGER HOLST, a subject of the Queen of the Netherlands, residing at Amsterdam, Netherlands, have invented certain new and useful Improvements in Photographic Cameras; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention relates to cameras, and especially to that class of cameras in which there is a finder or inclined mirror in front of the sensitized plate to reflect the image on a ground-glass plate located in the top of the camera, to enable focusing while the plate-holder is in position, and which is removed from the path of the rays from the lens before exposure. Some of such cameras when provided with a lens of short focal length could not be used with a lens of longer focal length, because the rays from the bottom of the cone of light from the lens would not be reflected to the ground-glass plate, the length of the mirror being dependent on the focal length of the lens, and if the mirror were made in two parts and one of said parts only capable of being moved out of the way of the cone of light a similar objection would arise with regard to the sensitized plate—only part would be illuminated. To obviate these difficulties, I have constructed a camera having the mirror composed of two movable abutting parts, with minor details of construction, as will be fully explained hereinafter, and more particularly pointed out in the claims.

Referring to the accompanying drawings, in which similar symbols of reference refer to like parts, Figure 1 is a vertical section of the camera. Figs. 2 and 3 are details showing the adjustable pinion. Fig. 4 is a section showing the mechanism for operating the mirror in side elevation. Fig. 5 is a section on the line $a\,b$, Fig. 4, showing the mirror and mechanism therefor in plan; and Fig. 6 is a section on the line $c\,d$ of Fig. 4, showing the back of the mirror and the operating mechanism. Fig. 7 is a section showing a modification of the adjustable pinion.

The camera consists of a box 1, divided by a vertical partition A, which carries the lens 2 and is capable of a back-and-forth motion to enable the focusing of the same, for which purpose there is provided a pinion D, meshing with a rack C at the base of the partition. A suitable plate-holder 3 is located at the rear of the camera and held in the usual manner. In the top of the camera is a light-well T, containing the ground-glass plate S, whereupon the image is reflected by a two-part mirror G H, so as to enable the proper focusing. This mirror consists of two abutting parts G and H, the lower part G being secured to the right-angled carrying-frame 8, hinged on the rod O to an upright 4, secured to the bottom of the camera.

Secured to the upper part of the frame carrying the upper mirror is an arm K at right angles thereto, the end of which is pivoted to one end of a link L, the other end of said link being pivoted to the support 8 of the lower mirror G. An arm I, loose on the pivoting-rod U of the upper mirror, is yieldingly secured to the frame of said mirror by a coil-spring $i$, one end $i'$ of said spring resting upon the upper part of said arm, the coil thereof passing around the pivoting-rod U, and the other end $i''$ being secured to the frame of the mirror. This yielding pressure transmitted to the mirror H enables the same to be pressed securely against the light-shaft T, and even after closing will permit the end of the operating-lever M, engaging a pin 5 on the end of the lever I, to be depressed more than enough to close the finder light-well T' when it engages a catch (not shown) to release the shutter (not shown) from its closed position. A pin or button N, passing through the top of the camera, engages the end of the operating-lever M, pivoted between its ends, to throw the mirrors into and out of position.

Suitable brackets 6 on the side of the camera receive the upper mirror and hold it at the proper angle when lowered.

After focusing the mirrors are to be moved from their position in front of the plate by depressing the button N. The front end of lever M being depressed elevates the rear end and with it the lever I, which, by means of the spring $i$, lifts the upper mirror to close the finder light-well T in a light-tight manner, while the lower mirror G is turned down by means of the arm K and link L, both mirrors being now out of range of the cone of light from the lens, whether said lens be of long or short focal length.

To show the effect of the lower part of the mirror G, I have shown in Fig. 1 a lens of short focal length in full lines and a lens of long focal length in dotted lines, the rays forming the lower part of the cones of light therefrom in dot-and-dash lines.

If the mirror were all in one piece and adapted for use with a long-focus lens, then when a short-focus lens were used it could not be lifted to close the finder light-well T, as it would strike against the partition A. If adapted for use with a long-focal-length lens, that part G on which the lower rays from the cone of light of a long-focal-length lens would fall would not be reflected to the focusing-plate T. If the lower part G were rigid, then for a short-focus lens the sensitized plate from Z to P would not be illumined, while for a long-focus lens the plate from Z to P' would not be illumined at all, while from P to Q in the first case and from P' to Q' in the second would only be partially illumined.

If a portrait-lens be used, the unillumined and dim portions would reach to R and R', which would give an unillumined portion of the plate about one-fifth of its area and a clearly illumined portion of only two-thirds; but by my construction I obviate these inconveniences by making both parts of the mirror capable of being moved out of the path of the light-cones, and, if desired, the lower mirror can be detached from the upper and allowed to rest in the bottom of the camera.

My further improvement consists in an adjustable pinion with regard to the several positions of the partition A, and for this purpose I provide a plate F, Figs. 2 and 3, with two bushings $o$ and $p$, fitting in holes $r'$ and $r^3$ in the sides of the camera and capable of being closed by a screw-plug $q$, and through either of these one end of the pinion-stem 7 is passed, the milled head E thereof being detachably secured thereto, while the other end of the pinion-stem has bearing in a perforated plate V, the holes thereof registering with the aforementioned bushings. There is between the bushings a hole $r^2$ and a similar one $r$ on one side of them that are covered by the plate F and are the same distance apart as the bushings from center to center, and adapted to receive the same and bearings in the plate V registering therewith. When the position of the pinion is such as to interfere with the movement of the partition A, the pinion is removed, the plate F unscrewed and reversed, the bushings being placed in the holes R and $R^2$ formerly covered, the holes R' and $R^3$ being then covered by the plate instead, thus enabling the use of a shorter rack C than could otherwise be used. To obtain the same end, I may also use long slots in the sides of the camera, which slots are closed with plates carrying a bush in which the pinion works. The plates are then shifted backward or forward as required by the focal length of the particular lens used, as clearly can be seen from Fig. 7.

Having thus described my invention, what I claim as new therein, and desire to secure by Letters Patent, is—

1. In a photographic camera, a finding-mirror behind the lens, composed of two parts, one of which is adapted to be elevated and the other depressed out of the path of the rays from the lens to the plate, substantially as described.

2. In a photographic camera, a finder light-well in the top thereof, covered with a ground-glass plate, a finding or focusing mirror composed of two abutting parts under said plate, means for elevating the upper part of said mirror to close the light-well, and simultaneously lowering the bottom part thereof, substantially as described.

3. In a photographic camera, a finding or focusing mirror composed of two abutting parts, a link connection between said parts, a lever yieldingly connected at one end to one of them and a button-operated main lever engaging the other end, substantially as described.

4. A box-camera, comprising an adjustable partition carrying a lens limited in its rearward motion by a light-well, a finder light-well in the upper rear portion of the camera covered by a ground-glass plate, a mirror behind the partition composed of two abutting parts, means for simultaneously moving the parts from the path of the rays from said lens and covering the light-well by one of them, brackets for supporting the mirror when behind the lens, and an adjustable pinion for moving the partition, substantially as described.

5. In a photographic camera, an adjustable pinion comprising a plate, two bushings therein forming bearings for the ends of the pinion-spindle, said camera provided with holes in its sides for receiving the bushings, and auxiliary holes normally closed by said plate and adapted to receive the bushings when the plate is reversed, and a second plate on the opposite inner side of the camera having perforations registering with the aforementioned holes forming bearings for the other end of the pinion-spindle, substantially as described.

6. In a photographic camera, an adjustable pinion comprising two plates each having a bush forming bearings for the ends of the pinion-spindle, said camera provided with slots in its sides for receiving the bushings and covered by the said plates in all positions of the same, substantially as described.

In testimony that I claim the foregoing as my invention I have signed my name in presence of two subscribing witnesses.

LODEWYK JAN RUTGER HOLST.

Witnesses:
AUGUST SIEGFRIED DOCEN,
JOHAN CAREL ZIMMERMAN.